United States Patent [19]
Klesow

[11] 3,874,455
[45] Apr. 1, 1975

[54] AUTOMATIC SPRINKLER VALVE
[76] Inventor: Gerald F. Klesow, 905 Holiday Ct., Concord, Calif. 94518
[22] Filed: June 20, 1974
[21] Appl. No.: 481,565

[52] U.S. Cl............... 169/19, 169/37, 236/100
[51] Int. Cl.............................................. A62c 37/06
[58] Field of Search .............. 169/37, 90, 41, 19; 236/100

[56] References Cited
UNITED STATES PATENTS
3,734,191  5/1973  Johnson et al................ 169/41 X
3,802,510  4/1974  Johnson.......................... 236/100 X Primary Examiner—Robert S. Ward, Jr.
Assistant Examiner—Michael Mar
Attorney, Agent, or Firm—Townsend and Townsend

[57] ABSTRACT

An automatic sprinkling device for use in fire protection systems which can be installed in a pendant or top-mounted attitude and which can be tested in situ in a quick and simple manner. A frame member having a pair of bowed arms defining a hollow interior is provided with a first externally threaded end portion for installation in a water supply line, the first end portion having a fluid bore and valve seat for accommodating a reciprocable stem valve. The frame member has an opposite end portion with a threaded bore for receiving an externally threaded hollow valve actuating member. The valve actuating member includes a temperature sensitive element which expands when heated and a translatable spindle received in the hollow interior having a first end coupled to the temperature sensitive element and a second end bearing against the stem end of the valve. The upper portion of the stem valve is received in a hollow guide member mounted in the frame interior, the guide member supporting a water deflector which controls the pattern of the water spray. A shield means mounted adjacent the temperature sensitive element prevents premature cooling of the element by egressing water when the sprinkler is actuated. A spring means normally biases the stem valve to the closed position. The sprinkler can be tested in situ by removing the valve actuating means and inserting a stylus probe into the bore of the guide means to force the stem valve open. At the same time, the temperature sensitive element can be tested by applying heat from a simple source and observing the translation of the spindle.

7 Claims, 4 Drawing Figures

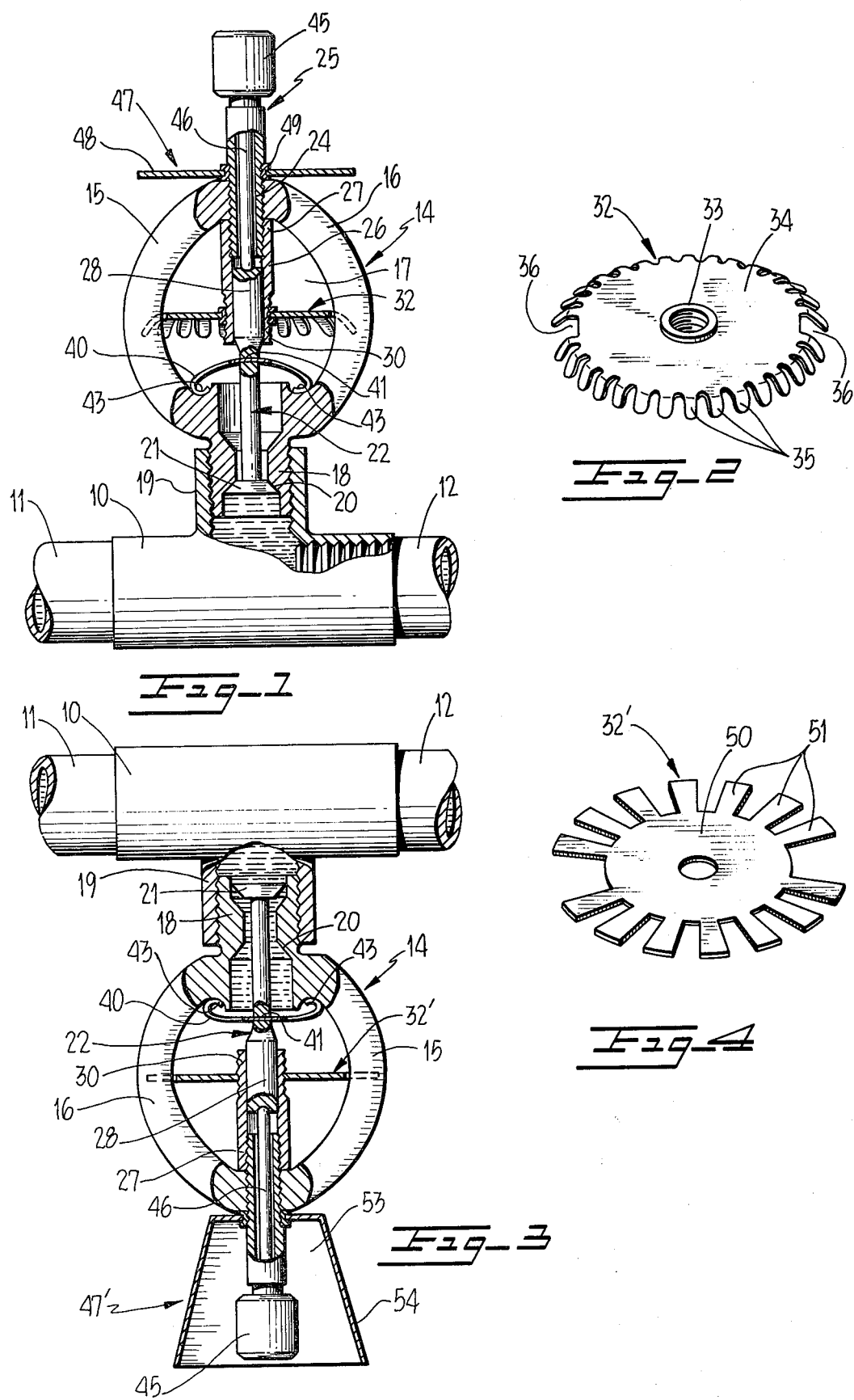

AUTOMATIC SPRINKLER VALVE

BACKGROUND OF THE INVENTION

This invention relates to automatic sprinkling devices of the heat responsive type.

Sprinkling devices are known which operate automatically in response to an increase in temperature in the immediate environment. In typical devices of this type, a heat sensitive element controls the position of a normally closed valve, either directly or indirectly through a plurality of working elements, to permit water in a pipeline in which the device is installed to flow through an outlet orifice and cascade down to the space below in order to extinguish a fire. Representative devices of this type are disclosed in U.S. Pat. Nos. 1,143,762, 2,164,611, 2,230,179, 3,698,483, and 3,702,160.

Known automatic sprinkling devices suffer from several disadvantages. Some such devices employ an inordinately large number of working parts which renders the devices extremely expensive to manufacture and assemble, and relatively prone to failure. Other devices employ tiny flow orifices which can be easily blocked by the ever present sediment in water supply systems and thus rendered inoperative. Still other devices may only be installed in the water supply pipe at a singular attitude, typically either pendant or top-mounted, so as to be suitable for use in only a limited number of applications.

These disadvantages are further compounded by the necessity of completely removing known automatic sprinklers from the water supply pipe fitting in order to perform a test to determine whether they are still operational. Failure to conduct such inspections at regular intervals, of course, is extremely dangerous since an inoperative sprinkler can mean the difference between extinguishing a fire with minor structural damage, and total destruction of the associated building. For this reason, such periodic inspections are faithfully conducted, frequently being required by law. The necessity of completely removing each automatic sprinkler from a system in which many such sprinklers are installed considerably increases the cost of conducting an inspection and lengthens the time required for such an inspection.

SUMMARY OF THE INVENTION

The invention comprises an automatic sprinkling device for use in fire protection installations which is extremely simple in design, inexpensive in construction and highly reliable in operation. The invention may be mounted in either a pendant or top-mounted attutide and is completely free of any flow orifice subject to clogging by sediment particles. Once installed, the device may be quickly tested in situ by relatively unskilled personnel.

In the preferred embodiment of the invention, a frame member is provided with a first end portion with a fluid bore and valve seat for accommodating a reciprocable stem valve, the end portion having external threads for permitting the apparatus to be threadably installed in a suitable pipe fitting in a water supply line. The frame member has an opposite end portion with a threaded bore for receiving an externally threaded hollow valve actuating member. The valve actuating member includes a temperature sensitive element which expands when heated and a translatable spindle received in the hollow interior having a first end coupled to the temperature sensitive element and a second end bearing against the stem end of the valve. A guide member mounted interior of the frame member has a hollow bore in which the upper portion of the stem valve is received in order to provide a guide way for the valve. The guide member supports a water deflector also mounted interior of the frame which controls the pattern of the water cascaded downwardly of the sprinkler. A shield means is provided adjacent the temperature sensitive element to prevent premature cooling of the element by egressing water when the sprinkler is actuated. A spring means is also provided for normally biasing the stem valve to the closed position.

When used in an upright installation, the water deflector comprises a crown-shaped disc having circumferentially arranged downwardly depending outwardly angled fingers and the water shield comprises an annular disc secured to the valve actuation means adjacent the temperature sensitive element. When used in a pendant installation, the water deflector comprises a disc having a plurality of circumferentially arranged outwardly extending fingers, and the shield means comprises an inverted cup secured to the valve actuating means and surrounding the temperature sensitive element.

Once installed, the invention may be tested for operability by simply removing the valve actuating means and inserting a stylus probe into a bore of the guide means to force the stem valve open. At the same time, the temperature sensitive element can be tested by applying heat from a simple source and observing the translation of the spindle.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a side elevational view partially in section of the preferred embodiment of the invention in an upright installation;

FIG. 2 is a perspective view of the water deflector of the device of FIG. 1;

FIG. 3 is a side elevational view partially in section of the preferred embodiment in a pendant installation; and FIG. 4 is a perspective view of the water deflector of the device of FIG. 3.

DESCRIPTION OF THE PREFERRED EMBODIMENT

Turning now to the drawings, FIG. 1 shows the preferred embodiment of the invention installed in an upright mode in a T-fitting 10 of a water supply system having supply pipes 11, 12 shown partially in the Fig. It is understood that, in practice, a plurality of sprinklers of the type shown in FIG. 1 are installed at predetermined locations in a structure and coupled to a source of water under pressure in the manner depicted in FIG. 1.

The invention includes a frame member indicated generally by reference numeral 14 which is preferably of integral construction, and comprises a pair of opposed arms 15, 16 joined at their extreme ends to form an open interior 17. Frame 14 is provided at a first end with an externally threaded boss 18 for threaded engagement with leg 19 of T-fitting 10. Boss 18 has a hollow interior provided with a valve seat 20 for the valve face 21 of a stem valve generally designated by reference numeral 22. The opposing end of frame 14 is provided with a threaded bore for receiving an externally threaded portion 24 of a valve actuation member generally designated by reference numeral 25.

A guide member 26 is mounted in interior 17 by means of a first internally threaded end portion 27 threadably engaged with portion 24 of valve actuating means 25. Guide member 26 has a hollow interior sized to accommodate the upper portion 28 of stem valve 22 to prevent lateral motion of this element when the valve is actuated. Mounted on externally threaded opposite end portion 30 of guide member 26 is a water deflector 32. As best seen in FIG. 2, water deflector 32 is provided with an internally threaded hub portion 33, an annular main body portion 34 and a plurality of downwardly and outwardly depending fingers 35 arranged circumferentially. Water deflector 32 is further provided with oppositely disposed notches 36 having a width sufficient to accommodate arms 15, 16 of frame 14 when the unit is assembled.

A spring wire 40 is received in a bore 41 in the stem portion of stem valve 22. Spring 40 has a pair of inwardly folded ends 43 which are nestled on land surfaces provided by the lower extremity of arms 15, 16, and provides an upward force tending to urge stem valve 22 to the closed position.

Valve actuating member 25 includes a temperature sensitive element 45 and an actuating spindle 46 received in a slight depression in the stem end of stem valve 22. Temperature sensitive element 45 encloses a fill of thermally responsive material consisting essentially of a wax which exhibits a very substantial increase in volume when subjected to a temperature increase over a predetermined narrow range. The upper end of actuating spindle 46 is coupled to this wax charge in such a manner that element 46 is translated within the hollow interior of portion 24 in response to expansion or contraction of the wax charge. Elements of this type are commercially available. Preferably, this element comprises a Power Pill thermostatic actuator sold by the Robert Shaw Controls Company of Knoxville, Tennessee. Other suitable equivalents will occur to those skilled in the art.

A shield means 47 comprising a disc 48 with an internally threaded hub 49 is received on threaded portion 24 of valve actuating member 25. This element prevents upwardly deflected water from cooling temperature sensitive element 45 prematurely when the valve is actuated.

To assemble, deflector 32 is inserted into the interior 17 so that arms 15, 16 of frame 14 are embraced in notches 36. Next, shield 47 is threaded onto valve actuating element 25, after which element 25 is threaded into the upper threaded bore of frame 14 and into end portion 27 of guide 26. Stem valve 22 is next inserted into the inlet end of boss 18 to seat valve face 21 on valve seat 20, after which spring wire 40 is inserted into bore 41 and loops 43 are formed. Lastly, the now-assembled sprinkling apparatus is threaded into leg 19 of T-fitting 10.

In operation, spring 40, together with the fluid pressure on the inlet face of stem valve 22, maintains this element in the closed position illustrated in FIG. 1. When the ambient temperature rises to the operating range of temperature sensitive element 45, the wax charge contained therein expands, translating spindle 46 and stem valve 22 downwardly, thereby opening the valve and permitting water to flow upwardly under supply pressure to the bottom surface of water deflector 32. Water striking this under surface is deflected outwardly and downwardly to provide an enveloping spray of water droplets for the region therebelow. Shield 47 insures that any water escaping above deflector 32 is not directed onto temperature sensitive element 45 to cause premature cooling of this element. When the temperature in the region adjacent temperature sensitive element 45 cools below the operating threshold, the wax charge contained therein contracts, and stem valve 22 is urged upwardly by spring 40 and the water pressure until the valve is again closed and the spindle is retracted to the position shown in FIG. 1.

FIG. 3 illustrates the preferred embodiment mounted in a pendant installation. In this configuration, the operating elements are substantially identical to those discussed above with reference to FIG. 1, with the exception of the water deflector and the temperature sensitive element shield. As illustrated in FIG. 4, water deflector 32' comprises a planar disc 50 having a plurality of radially extending fingers 51 which are preferably substantially coplanar with disc 50. Shield 47' comprises an inverted cup 53 having a continuous tapered side wall 54 of sufficient axial extent to surround temperature sensitive element 45. Assembly and operation of the FIG. 3 pendant configuration is substantially identical with that described above.

To test the invention in either the pendant or upright installation, it is merely necessary to remove valve actuating element 25, insert a slender probe into the interior of guide 26 and translate stem valve 22 manually to the open position so that water egresses from the device. After manually actuating stem valve 22, the probe is removed and the spring 40 and the water pressure return stem valve 22 to the closed position. At the same time, the temperature sensitive element 45 may be tested by applying heat from a simple source until element 45 is raised to the operating temperature, and observing translation of spindle 46. As will be evident to those skilled in the art, the test procedure requires no costly instrumentation and may be accomplished in a matter of seconds.

As will now be apparent, automatic sprinkling devices constructed in accordance with the teaching of the invention are extremely simple in design and construction and highly rugged and reliable in operation. Further, such devices are completely devoid of any minute orifices and thus immune from clogging by sedimentary particles in the water supply lines. In addition, such devices may be mounted in either a pendant or an upright installation without impairing the operational characteristics thereof. Further, once installed, the individual sprinkling devices may be easily tested for operability without the necessity of skilled personnel or expensive test instruments.

While the above provides a full and complete disclosure of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. An automatic sprinkler apparatus for fire extinguishing systems comprising:

a frame member having a pair of joined bowed arms defining a hollow interior, said frame member having a first end portion including an externally threaded boss member adapted to be threadably engaged with a water supply line, said boss member having an internal bore providing a valve seat, said frame member having a second end portion with an internally threaded bore;

a valve actuation member threadably engaged in said second end portion, said valve actuating member having an externally threaded substantially cylindrical mounting member, a temperature sensitive element carried by said mounting member including an expansion element whose volume is a function of ambient temperature, a valve actuation spindle coupled to said expansion element for actuation thereby, and shield means secured to said mounting member for shielding said temperature sensitive element from projected water droplets;

a guide means secured to said mounting member and having a hollow interior;

water deflector means secured to said guide means in said interior of said frame member for deflecting water into a desirable spray pattern;

a stem valve reciprocably received in said guide means for controlling the egress of water coupled to the inlet of said boss from said water supply line; and biasing means for urging said stem valve towards a normally closed position wherein said valve is in contact with said valve seat, said valve actuating spindle being normally in contact with the free end of said stem valve.

2. The apparatus of claim 1 wherein said water deflector comprises a crown shaped member having a annular planar main body portion, a plurality of downwardly depending circumferentially arranged finger-like elements, and oppositely disposed notch portions having a width sufficient to embrace said bowed arms of said frame member.

3. The apparatus of claim 1 wherein said shield means comprises an annular disc carried by said mounting member adjacent said temperature sensitive element.

4. The apparatus of claim 1 wherein said water deflector comprises an annular disc having a plurality of circumferentially arranged finger-like elements substantially coplanar with said disc.

5. The apparatus of claim 1 wherein said shield means comprises a cup-shaped member having side walls enveloping said temperature sensitive element.

6. The apparatus of claim 1 wherein said shield means comprises a hollow frusto-conical member having tapered side walls with an axial length sufficient to envelope said temperature sensitive element.

7. The apparatus of claim 1 wherein said stem valve is provided with a transverse bore, and wherein said spring means comprises a spring wire element received in said bore and having a pair of inwardly folded end portions, said end portions normally resting on a pair of lands provided by said frame member.

* * * * *